MOTIONAL FEEDBACK AMPLIFIER SYSTEMS

Original Filed Aug. 10, 1964 4 Sheets-Sheet 1

INVENTOR.

Martin G. Reiffin

Sept. 22, 1970 M. G. REIFFIN 3,530,244

MOTIONAL FEEDBACK AMPLIFIER SYSTEMS

Original Filed Aug. 10, 1964 4 Sheets-Sheet 3

United States Patent Office 3,530,244

Patented Sept. 22, 1970

3,530,244
MOTIONAL FEEDBACK AMPLIFIER SYSTEMS

Martin G. Reiffin, 102 Gallows Hill Road, Peekskill, N.Y. 10566

Original applications Aug. 10, 1964, Ser. No. 388,399, and July 7, 1966, Ser. No. 563,586. Divided and this application Feb. 13, 1967, Ser. No. 629,047

Int. Cl. H03f *3/26;* H04r *3/08*

U.S. Cl. 179—1 10 Claims

ABSTRACT OF THE DISCLOSURE

A bridge network connected to the output of an amplifier and a loudspeaker provides a motional feedback signal functionally related to the cone movement. The signal is fed back degeneratively to the amplifier. The loudspeaker and amplifier stages within the feedback loop are direct-current-coupled. In a second embodiment the feedback signal is generated by a feedback coil attached to the cone.

CROSS-REFERENCES

This application comprises one part which is a division of my prior copending application, Ser. No. 388,399 filed Aug. 10, 1964 and entitled "Transistor Power Amplifiers and Feedback Systems Embodying Same," now abandoned; and another part which is a division of my prior copending application, Ser. No. 563,586 filed July 7, 1966 and entitled "Transistor Power Amplifiers for High Fidelity Music Reproduction," now abandoned.

FIELD OF THE INVENTION

This invention relates to motional feedback amplifier systems wherein a signal functionally related to the motion of a loudspeaker or other transducer is fed back degeneratively to the amplifier so as to linearize the response of the transducer.

This motional feedback is particularly advantageous in high fidelity music reproduction because in the present state of the art the loudspeaker is in all respects the most imperfect component in the entire sound system and usually generates, particularly at low frequencies, more harmonic, intermodulation, frequency and transient distortion than all the other components put together. It would seem that feedback, which is responsible for the relative perfection of the amplifiers, is the only feasible way to reduce the distortion of loudspeakers to the level of the other components.

DESCRIPTION OF THE PRIOR ART

In the prior art numerous attempts to apply motional feedback have been made with little or negligible improvement in loudspeaker performance. The failure to achieve performance approaching the relative perfection of amplifiers was inevitably and inherently due to the excessive low-frequency phase shift in the prior art amplifiers which prevented the application of a substantial amount of feedback with stability.

SUMMARY OF THE INVENTION

It is therefore a primary object of the invention to obviate the above-described deficiency of the prior art by the direct-current-coupled circuitry of the amplifiers disclosed in my prior applications referred to above and wherein driver and output transformers as well as output coupling capacitors are eliminated so as to avoid the low-frequency phase shifts produced by these components.

Another object is to provide in a direct-coupled amplifier in accordance with said prior applications a bridge network including the loudspeaker for generating a motional feedback signal functionally related to the cone movement and which may be fed back to an early stage of the amplifier.

A further object is to provide another system wherein the motional feedback signal is generated by a feedback coil connected to the cone and with the overhang of the feedback coil at least equal to or greater than that of the voice-coil so that the feedback coil will remain within a relatively uniform magnetic field during large excursions of the cone and thereby generate a signal proportional to the cone movement.

DETAILED DESCRIPTION

Figure 1:
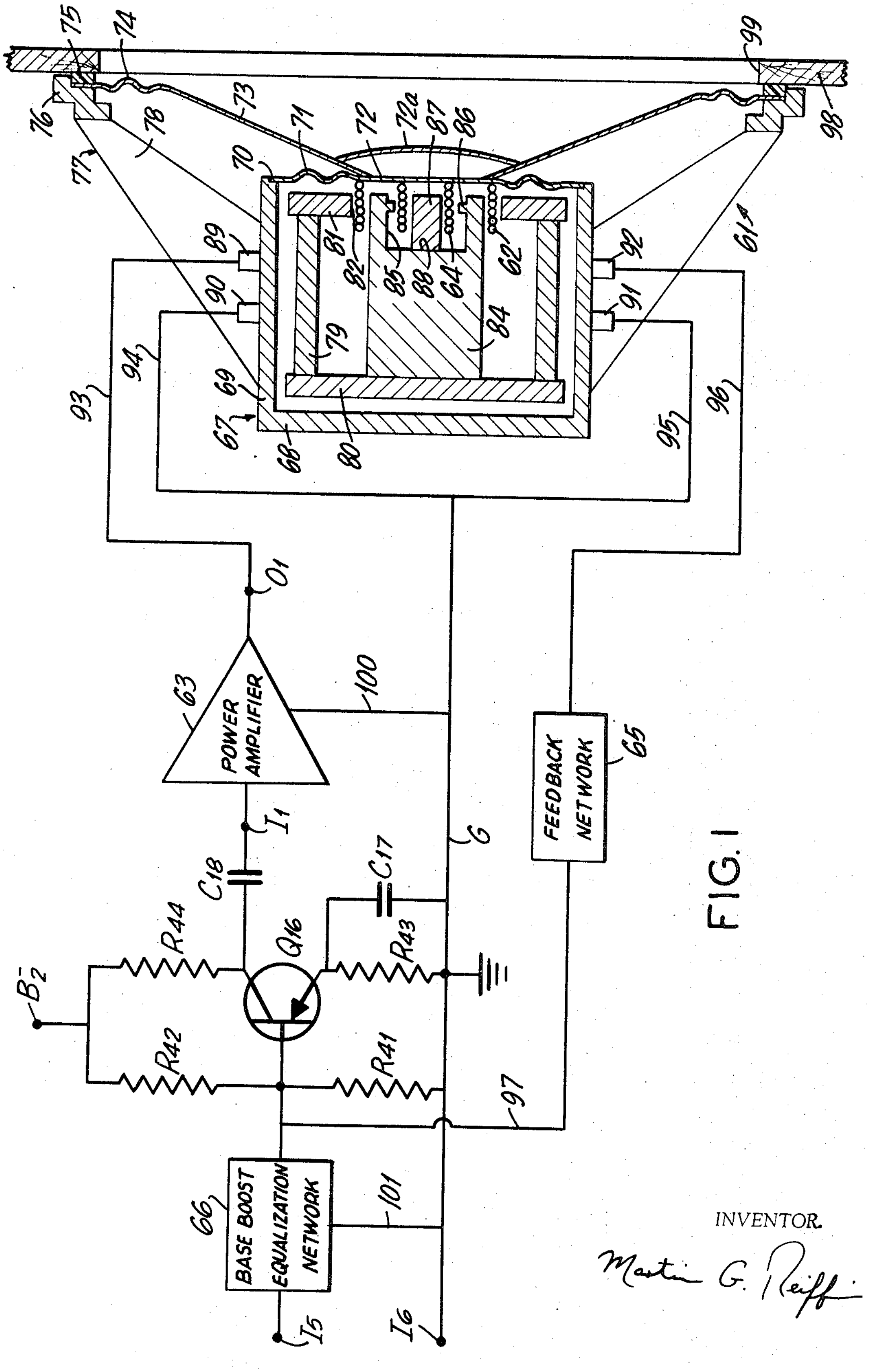
FIG. 1 shows a motional feedback system wherein the feedback signal is generated by a feedback coil mechanically connected to the loudspeaker cone.

Referring now to FIG. 1 the amplifiers in accordance with the present invention are there shown utilized in a form of motional feedback system wherein the feedback signal is generated by a feedback coil mechanically connected to the loudspeaker cone. This system comprises a loudspeaker indicated generally at 61 and having a voice-coil 62 energized by a power amplifier 63 which may be in accordance with any of the circuits of said prior applications.

In order to provide increase gain for the application of feedback, amplifier 63 is preceded by an additional voltage-amplification stage comprising transistor Q16 operating in the common-emitter mode. Speaker 61 also has a feedback coil 64 connected by a feedback network 65 to the base of transistor Q16. A base-boost equalization network 66 is provided before the feedback injection point.

Speaker 61 comprises a magnet housing 67 having a rear wall 68 and a cylindrical wall 69. The latter is provided with a recessed forward edge 70 to which is secured the outer periphery of a flexible centering spider 71 having its inner annulus secured to the apex portion 72 of diaphragm or cone 73 having its outer edge supported by a flexible suspension 74 secured between an annular mounting gasket 75 and the rim 76 of the speaker basket 77. Cone 73 is provided with a dust cover **72*a* over its apex portion 72. Rim 76 is rigidly mounted with respect to magnet housing 67 by ribs 78**.

Within magnet housing 67 is a magnetic circuit structure comprising a cylindrical ring magnet 79 having its rear end abutting the outer area of a circular iron return plate 80 and its forward end abutting the outer arm of an annular gap plate 81. The latter is provided with a central opening the annular periphery 82 of which constitutes one pole of the air gap within which voice-coil 62 extends. The other pole of this gap is provided by the forward end of a main cylindrical iron core 84 which has its rear end abutting the central area of return plate 80.

The forward end of core 84 is provided with a cylindrical recess 85 having an integrally formed radially-inwardly extending annular projection 86 constituting the outer pole of the air gap within which extends feedback coil 64. The other pole of this gap is formed by the forward end of a smaller core 87 having its rear end abutting the planar rear face 88 of recess 85. It will thus be seen that the magnetic flux provided by ring magnet 79 flows out of the forward end thereof in a radial direction through gap plate 81 and across the gap of voice-coil 62 into the forward end of main core 84. The major portion of this magnetic flux then flows axially rearwardly through main core 84 and then returns to the rear end of ring magnet 79 by flowing radially outwardly through return plate 80. A smaller portion of the flux entering the forward end of main core 84 flows radially inwardly through the annular pole projections 86, then across the gap of feedback coil 64, then into the forward end of smaller core 87, and then axially rearwardly through main core 84. The gaps for both coils 62 and 64 are thereby provided with a magnetic field.

It will be seen that the axial length of voice coil 62 is greater than the width (the dimension in the axial direction) of the pole portion 82 of gap plate 81 so that the opposite ends of voice-coil 12 project axially outwardly beyond its gap. This extension of the coil is generally referred to as "overhang" and is provided in order to maintain approximately the same number of effective field-cutting coil turns within the magnetic field as voice-coil 62 reciprocates during movement of cone 23. That is, as turns at one end of coil 12 leave the gap an equal number of turns enter the gap at the opposite end so that the magnetic field cut by the effective turns is approximately uniform throughout the travel of the coil. The equivalent result is sometimes achieved by making the coil length shorter than the gap length so that the entire coil always remains substantially within the gap. Therefore the term "overhang" will be used herein to refer to the difference in lengths between the coil and the gap, irrespective of which length is larger.

It is most important to note that the overhang of feedback coil 64 is disclosed as being greater than the overhang of voice-coil 62. This is achieved in the disclosed embodiment by making the coils 62, 64 of about the same length and providing that the gap of feedback coil 64 be of less length than that of voice-coil 62 in view of the relatively narrow pole projection 86. It is critical for the reduction of harmonic and inter-modulation distortion by the motional feedback that the overhang of feedback coil 64 be at least as large as the overhang of voice-coil 62. Otherwise feedback coil 64 will leave its gap and cut a more nonuniform portion of the magnetic field on amplitude peaks of the cone excursion while voice-coil 62 is still cutting a relatively more uniform field, with the result that the feedback signal generated by feedback coil 64 will not be proportional to the cone movement and the distortion components of the feedback signal will not correspond to those radiated by the cone. Hence the feedback will not be effective to partially cancel out the speaker distortion.

Although this result may be largely obviated and substantial distortion reduction may be achieved by making the overhang of feedback coil 64 equal to that of voice-coil 62, it is preferable to provide a sufficiently large feedback coil overhang so that feedback coil 64 always has the same number of effective turns in its gap even during peaks of the maximum cone excursion for which the speaker is designed. This assures that the feedback signal will be directly correlated to the cone motion for effective distortion reduction.

The opposite ends of voice-coil 62 are connected in the usual manner to respective terminals 89, 90 and the opposite ends of feedback coil 64 are similarly connected to the other pair of terminals 91, 92. Voice-coil terminal 89 is connected to output terminal 01 of power amplifier 63 by lead 93. Amplifier 63 is connected to ground bus G by lead 100. One end of feedback coil 64 is grounded by lead 95 extending from feedback coil terminal 91. The other feedback coil terminal 92 is connected by lead 96 to one end of feedback network 65 having its other end connected by lead 97 to the base of transistor Q16. Voice-coil terminal 90 is connected to ground bus G through lead 94.

The base of Q16 is biased by resistors R41, R42 extending in series from a decoupled power supply terminal $B_2-$ to ground. The emitter of Q16 is connected to ground through resistor R43 and its collector is provided with a load resistor R44 connected at its upper end to supply terminal $B_2-$. The collector is coupled by capacitor C18 to input terminal I1 of amplifier 63, but this coupling may be direct if so desired.

Base boost equalization network 66 has its output connected to the base of Q16, its common terminal connected by lead 101 to ground, and its input constitutes the input terminal I5 of the disclosed version of the system. The other system input I6 is grounded to bus G.

Speaker 61 is shown mounted on a baffle board 98 having an opening 99. Baffle board 98 is part of a so-called "infinite baffle" which may be either in the form of a wall or a totally enclosed cabinet, so as to isolate the rear radiation of the speaker.

Transistor Q16 is inserted to provide additional gain required for the application of large amounts of feedback. It also enables the use of a larger impedance for feedback network 65 so as to prevent a portion of the input signal from shorting through the low impedance feedback coil 64 instead of flowing into the succeeding stage. The added gain of transistor Q16 also enables feedback coil 64 to be made with fewer turns and/or finer wire and minimizes the magnetic flux required in the gap of feedback coil 64.

Feedback network 65 may also be designed by known network synthesis methods to provide the desired amount of motional feedback with maximum stability margin and optimum transient response, as required by the particular characteristics of the specific speaker employed. If speaker 61 is to be used as a woofer for the reproduction of only the lower portion of the frequency spectrum, an electronic crossover (not shown) may be added before base boost network 66 and feedback network 65 may include reactive components to roll off the high frequency response and/or shift the phase at high frequencies so as to improve the stability margin at the high end, as will be understood by those skilled in the art.

Figure 2:
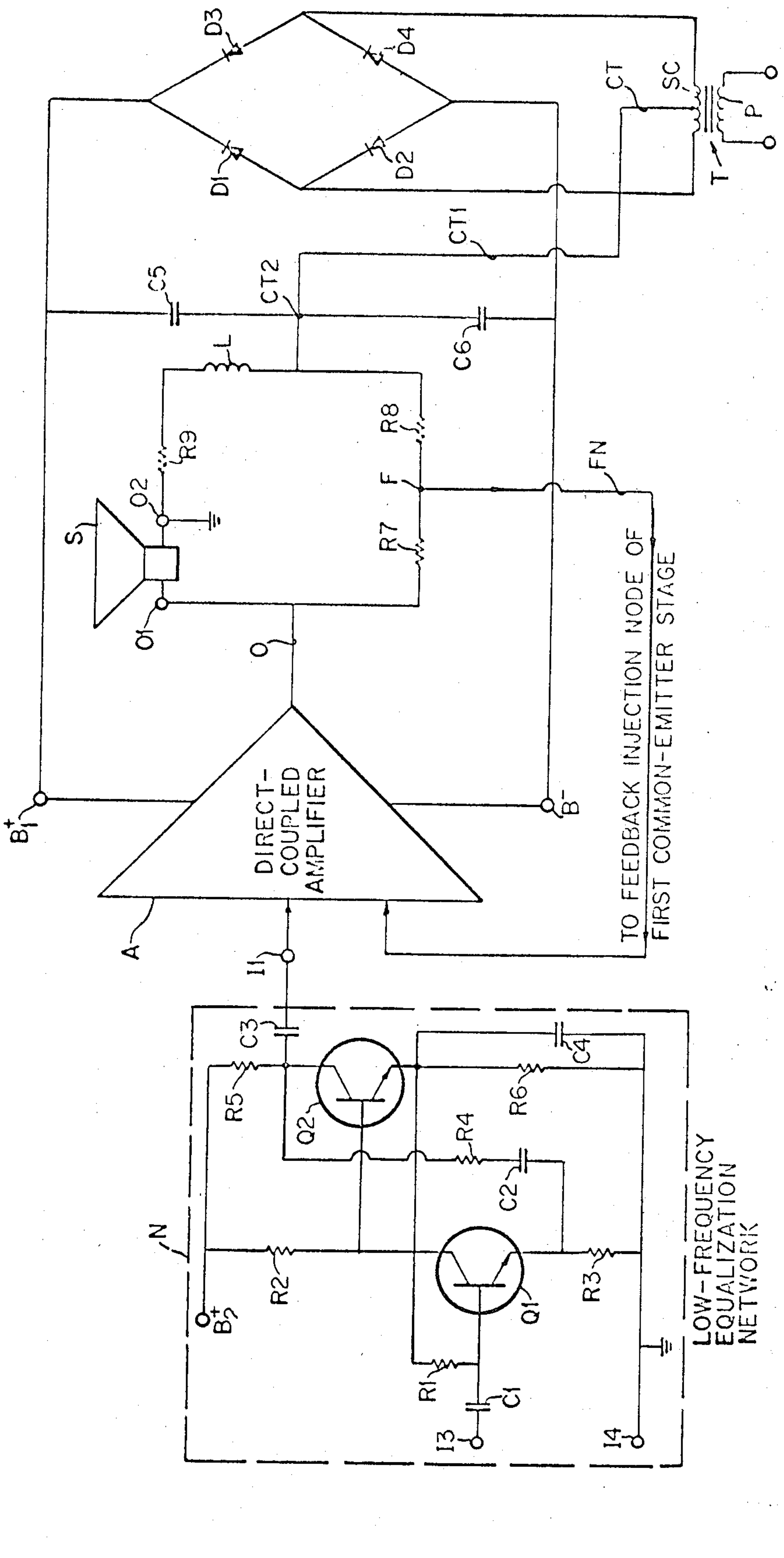
FIG. 2 shows another motional feedback system in which may be utilized any of the direct-coupled amplifiers of said prior applications.

In FIG. 2 there is shown a motional feedback system comprising a low-frequency equalization network N, a direct-coupled amplifier A, a loudspeaker S, a center-tapped power supply, and a network including resistors R7, R8, R9 and inductor L for generating a feedback signal of a magnitude and phase corresponding to the motion of the cone of loudspeaker S.

Amplifier A may be in accordance with any of the direct-coupled circuits disclosed in said prior copending applications. The output of low-frequency equalization network N is preferably coupled by capacitor C3 to the input terminal I1 of amplifier A having the base of its first stage connected to terminal I1. Network N serves to boost the base response of the system in order to compensate for the low-frequency rolloff in response of loudspeaker S due to the damping of the loudspeaker cone resonance by the motional feedback. The details of network N, to be described below, are merely illustrative of one of the many techniques which may be employed to flatten the low-frequency response of the system and it will be obvious that other types of equalization may be substituted therefor.

The output terminal O1 direct-coupled to the output stage of amplifier stage A through output bus O is in turn direct-coupled to one terminal of loudspeaker S having its other terminal direct-coupled to the grounded terminal O2. Connected to the latter is resistor R9 in series with inductor L which is connected to the center-tap of a split power supply. The latter comprises a power transformer T having a primary winding P and a secondary winding SC having its opposite ends connected to a conventional rectifier bridge comprising rectifiers D1, D2, D3, D4. The transformer secondary is split and is provided with a center tap CT connected through lead CT1 to the center-tap node CT2 of the power supply. Node CT2 is not grounded as is customary, but instead is connected to ground through the series network consisting of inductor L and resistor R9.

Extending from the positive terminal $B_1^+$ of the power supply is a filter capacitor C5 having its other end connected to center-tap node CT2 and another filter capacitor C6 similarly extends between the negative supply terminal $B^-$ to said node CT2. The rectifier bridge D1, D2, D3, D4 is connected in the usual manner to said power supply terminals $B_1^+$, $B^-$. The network for deriving the motional feedback signal further comprises a pair of resistors R7, R8 connected in series between output bus O of amplifier A and the center-tap node CT2 of the power supply. The feedback pickoff junction of resistors R7, R8 at node F is connected by a feedback lead or network FN to the feedback injection node of the first common-emitter stage of amplifier A.

The magnitudes of resistor R9 and inductor L are selected so as to have a predetermined ratio with respect to the blocked voice-coil impedance of speaker S. For example, the magnitude of resistor R9 may be 1/10 of the direct-current resistance of the speaker voice-coil and the magnitude of inductor L will then be 1/10 of the blocked voice-coil inductance of the speaker. The magnitudes of resistors R7, R8 are then selected so as to maintain this ratio. That is, the magnitude of resistor R8 would then be selected so as to be 1/10 of the magnitude of resistor R7.

It will thus be seen that loudspeaker S constitutes one arm of a bridge wherein the series combination of resistor R9 and inductor L constitutes a second arm and the other two arms are formed by resistors R7 and R8. Since the half of the bridge comprising loudspeaker S, resistor R9 and inductor L extends in parallel with the other half comprising resistors R7 and R8, each half will have the same potential thereacross; that is, the potential difference between output bus O and the power supply center-tap node CT2. If the voice-coil of loudspeaker S were blocked so as to eliminate the motional impedance, then the feedback node F at the junction of the resistor R7 and R8 would remain at ground potential as the hot amplifier output terminal O1 swings with respect to ground. This is because the ratio of the blocked loudspeaker voice-coil impedance with respect to bridge arm R9, L is the same as the magnitude ratio of resistor R7 to resistor R8 so that a null condition is maintained between the grounded output terminal O2 and the feedback node F in the absence of any voice-coil motion of loudspeaker S.

However, if it now be assumed that the cone and voice-coil of loudspeaker S are no longer blocked but are allowed to move in the normal manner, the total impedance of loudspeaker S will then be increased by the motional impedance. Since the latter is in turn proportional to the motion of the loudspeaker, the total impedance between amplifier output terminals O1 and O2 will thus be a function of the cone motion. The bridge will no longer be balanced and instead of the null condition between grounded output terminal O2 and feedback node F there will exist therebetween a potential difference corresponding to the motion of the cone of loudspeaker S. There is thus generated at node F a motional feedback signal. This feedback signal is inserted by network FN degeneratively into the feedback injection node of preferably the first common-emitter or other voltage amplification stage. However, it will be understood that other negative feedback injection nodes may be utilized.

The low-frequency equalization network N comprises a hot input terminal I3 coupled by capacitor C1 to the base of a transistor Q1 having its emitter connected to ground through resistor R3 and its collector connected to positive supply terminal $B_2^+$ through a collector load resistor R2. The other input terminal I4 is grounded as shown. The collector of transistor Q1 is direct-coupled to the base of a second transistor Q2 having its emitter connected to ground through resistor R6 and its collector connected to power supply terminal $B_2^+$ through collector load resistor R5. Base bias for transistor Q2 is provided by the collector load resistor R2 of transistor Q1 and base bias for transistor Q1 is provided by a resistor R1 extending from the emitter of Q2 to the base of transistor Q1, so as to provide a direct-current feedback loop to maintain the bias conditions of both stages at their respective operating points. Emitter resistor R6 is provided with a bypass capacitor C4.

Base boost equalization at low frequencies is provided by a feedback network comprising a resistor R4 and a capacitor C2 extending in series between the collector of transistor Q2 and the emitter of transistor Q1. The relative magnitude of these feedback components C2, R4 are selected so that for the upper base and higher frequency ranges capacitor C2 has negligible impedance and therefore the gain of the two stages is maintained constant by the feedback through resistor R4, whereas in the lowest frequency range where base boost is desired, the impedance of capacitor C2 increases so as to reduce the feedback and thereby increase the gain of network N in approximately inverse relation to frequency.

Figure 3:
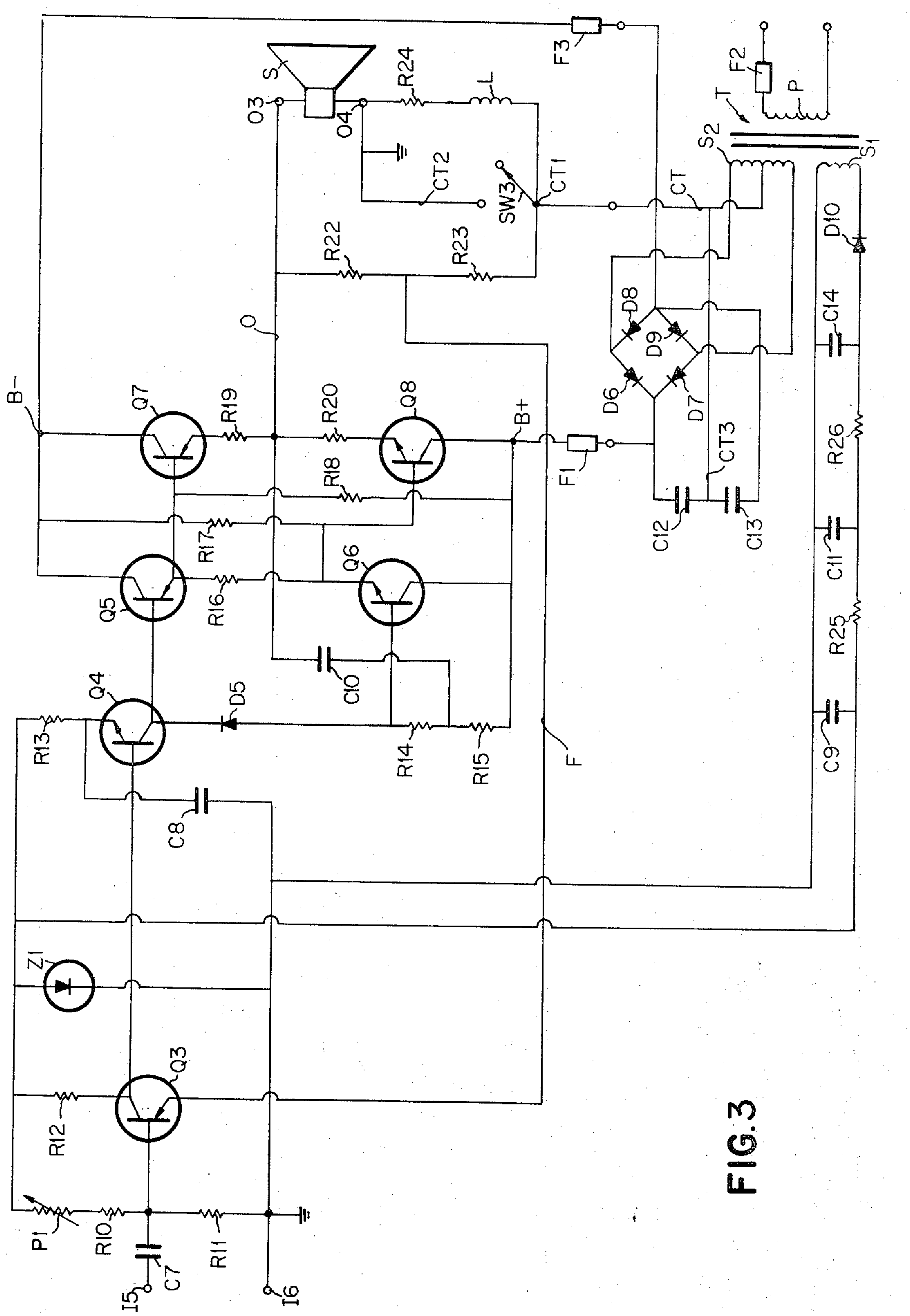
FIG. 3 shows one form of direct-coupled amplifier in the motional feedback system of FIG. 4.

Referring now to FIG. 3 there is shown a direct-coupled amplifier embodied in the motional feedback system described above with respect to FIG. 2. The hot input terminal 15 is coupled by capacitor C7 to the base of a PNP transistor Q3 operating in the common-emitter mode. The other input terminal I6 is grounded as shown. The base is biased by the series arrangement of potentiometer P1 and resistor R10 extending from the negative electrode of a Zener diode Z1 which regulates an auxiliary power supply comprising transformer secondary $S_1$, rectifier D10, and a filter network comprising capacitors C9, C11, C14 and resistors R25, R26. The lower end of resistor R10 is connected to the base of transistor Q3 which is further provided with a bias resistor R11 extending from the base to ground.

The collector of transistor Q3 is direct-coupled to the base of an NPN transistor Q4 constituting the second common-emitter stage and having its emitter connected by resistor R13 to the negative electrode of Zener diode Z1. The emitter of transistor Q4 is provided with a bypass capacitor C8 to ground. Connected in series with the collector of transistor Q4 are a pair of resistors R14, R15 and the usual temperature-compensating bias diode D5. The conventional bootstrapping capacitor C10 extends from output bus O to the junction of resistors R14, R15.

The collector of transistor Q4 is direct-coupled to the base of a PNP drive transistor Q5 and the positive terminal of diode D5 is similarly direct-coupled to the base of an NPN drive transistor Q6. Drive transistors Q5, Q6 are of opposite polarity types so as to constitute a so-called complementary-symmetry drive stage. The collector of transistor Q5 is connected to the negative supply terminal $B^-$ of a power supply to be described below and the collector of transistor Q6 is similarly connected to the positive terminal $B^+$ of the power supply. The respective emitters of drive transistors Q5, Q6 are connected by a bias resistor R16.

The output stage is also shown to be of the complementary-symmetry type and comprises PNP transistor Q7 and NPN transistor Q8. The collector of transistor Q7 is connected to the negative supply terminal $B^-$ and the collector of transistor Q8 is connected to the positive supply terminal $B^+$. The respective emitters of output transistors Q7, Q8 are connected by bias resistors R19, R20 to output bus O. The base of PNP output transistor Q7 is direct-coupled to the emitter of PNP drive transistor Q5 and the base of NPN output transistor Q8 is similarly direct-coupled to the emitter of NPN drive transistor Q6. In order to reverse-bias the base-emitter junctions of output transistors Q7, Q8 during their respective non-conducting halves of the operating cycle, the base of transistor Q7 is provided with a resistor R18 extending to the positive supply terminal $B^+$ and the base of transistor Q8 is provided with a resistor R17 extending to the negative supply terminal B−.

The main power supply is energized by the secondary $S_2$ of the power transformer T having its primary energized through fuse F2 from the usual wall outlet of the house supply (not shown). Transformer secondary $S_2$ has a center-tap from which extends a lead OT to a terminal CT1 connected to a switch SW3 shown in the open position. When switch SW3 is closed node CT1 is connected to ground through lead CT2. The opposite ends of transformer secondary $S_2$ are connected to a conventional rectifier bridge D6, D7, D8, D9. This bridge is in turn connected in the usual manner to a pair of capacitors C12, C13 connected through lead CT3 to the center-tap connection CT of transformer secondary $S_2$. The junction of rectifiers D6, D7 and the positive terminal of capacitor C12 are connected through fuse F1 to the positive terminal B+ of the power supply. In a similar manner, the junction of rectifiers D8, D9 and the negative terminal of capacitor C13 are connected through fuse F3 to the negative terminal B− of the power supply.

The hot output terminal Q3 is direct-coupled through bus O to the output stage Q7, Q8 and the other output terminal O4 is grounded. The loudspeaker S or other load is direct-coupled between output terminals O3, O4 so as to constitute one arm of the bridge for deriving the motional feedback signal. The other arm in series with loudspeaker S comprises a resistor R24 and an inductor L. As described above with respect to FIG. 2, the magnitudes of resistor R24 and the block voice-coil resistance of loudspeaker S are related in a predetermined ratio. The magnitude of inductor L and the blocked voice-coil inductance of loudspeaker S are similarly related by the same ratio, as are also the respective magnitudes of the other arms of the bridge formed by resistors R22 and R23. The motional feedback signal is thus derived at the junction of resistors R22 and R23 and this signal is fed by a feedback lead or other network F to the emitter of transistor Q3 constituting the first common-emitter tsage. The motional feedback arrangement may be converted to a conventional negative feedback system by merely actuating a switch SW3 so as to ground the center-tap connection CT of the main power supply.

Figure 4:
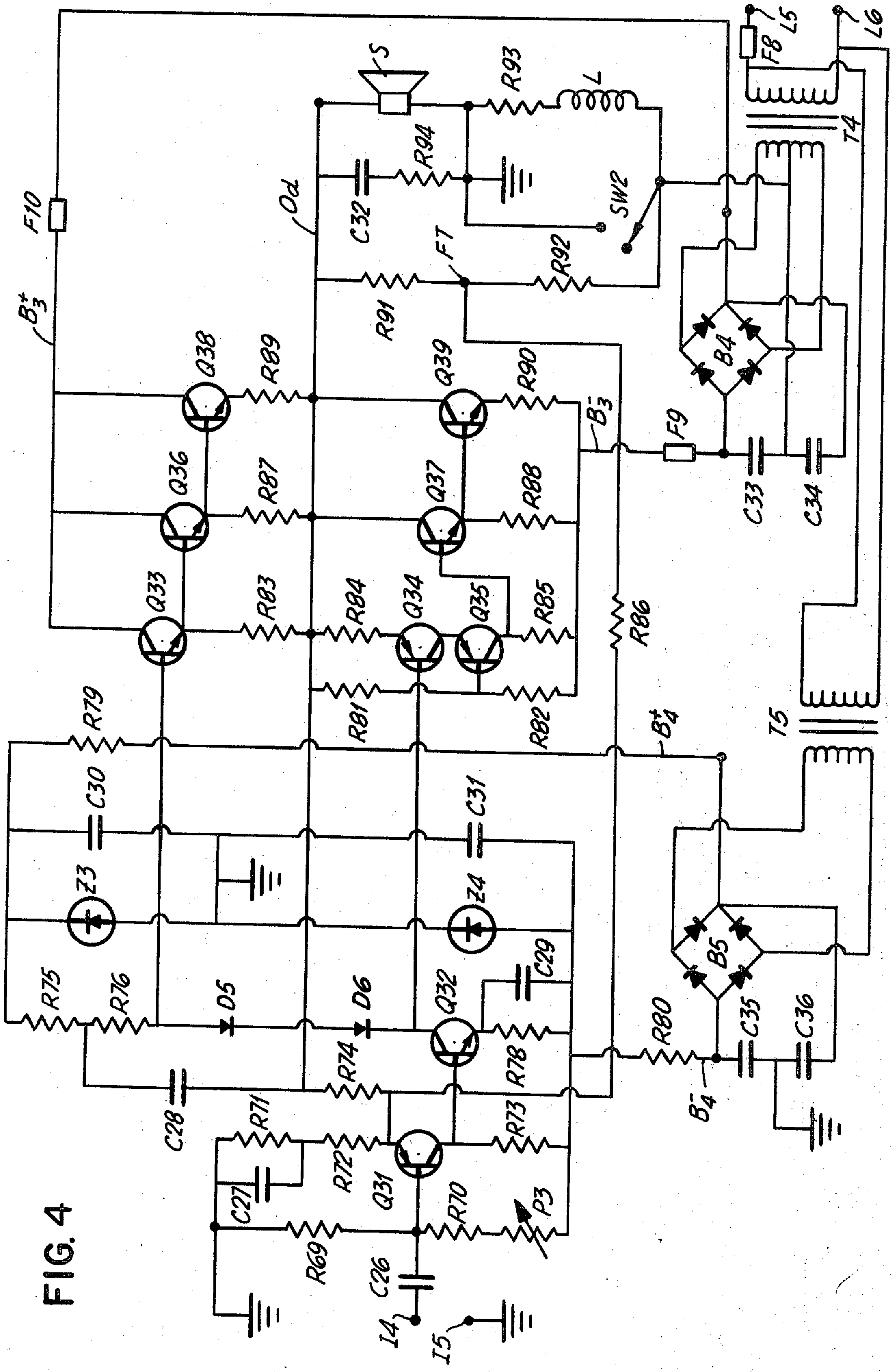
FIG. 4 shows another form of direct-coupled amplifier embodied in the motional feedback system.

Referring now to FIG. 4 there is disclosed another form of direct-coupled amplifier embodied in the motional feedback system of FIG. 2. The first stage comprises a PNP transistor Q31 operating in the common-emitter mode and having its base biased by potentiometer P3 and resistors R69, R70. The hot input terminal I4 is coupled by capacitor C26 to the base of transistor Q31. The other input terminal 15 is grounded. The emitter of transistor Q31 is connected to ground through emitter resistors R71 and R72, the former being bypassed by a capacitor C27. The collector of transistor Q31 is provided with a load resistor R73 extending to the positive terminal of a Zener-regulated auxiliary power supply to be described below.

The second common-emitter stages comprises an NPN transistor Q32 having its base direct-coupled to the collector of the first stage transistor Q31. The emitter of transistor Q32 is provided with a resistor R78 bypassed by a capacitor C29. The collector of transistor Q32 is provided with two temperature-compensating bias diodes D5, D6 in series with load resistors R75 and R76. The junction of the latter is connected to one end of the usual bootstrapping capacitor C28 having its other end connected to the output bus O*d*.

The Zener-regulated auxiliary power supply comprises a power transformer T5 having its primary connected to line terminals L5, L6 through fuse F8. The secondary of transformer T5 is connected to a rectifier bridge B5 which is in turn connected to a pair of filter capacitors C35, C36. A resistor R80 extends from the negative supply lead $B_4^-$ to the negative electrode of a Zener diode Z4 having its positive electrode connected to ground, and a resistor R79 extends from the positive supply lead $B_4^+$ to the positive electrode of a Zener diode Z3 having its negative electrode grounded as shown. A pair of capacitors C30, C31 may be connected in parallel with the respective Zener diodes Z3, Z4. There is thus provided for the first two stages comprising transistors Q31, Q32 a Zener-regulated supply having an output independent of the ripple content and load regulation drop of the main power supply as well as of the line voltage variations of the house supply represented by line terminals L5, L6.

The next stage is a complementary-symmetry drive stage comprising an NPN transistor Q33 and a series-connected pair of PNP transistors Q34, Q35. The emitter of transistor Q33 is connected through resistor R83 to output bus O*d* and the emitter of transistor Q34 is similarly connected through resistor R84. The base of transistor Q35 is driven by a voltage-divider arrangement comprising resistors R81, R82 extending in series between output bus O*d* and the negative supply lead $B_3^-$. The base of transistor Q33 is direct-coupled to the junction of resistor R76 and diode D5, and the base of transistor Q34 is direct-coupled to the collector of transistor Q32. The collector of transistor Q33 is connected to the positive supply lead $B_3^+$ and the collector of transistor Q35 is connected through resistor R85 to the negative supply terminal $B_3^-$.

The next stage comprising NPN transistors Q36, Q37 may operate in the emitter-follower mode. The collector of transistor Q36 is connected to the positive supply lead $B_3^+$ and the collector of transistor Q37 is connected to output bus O*d*. The base of transistor Q36 is direct-coupled to the emitter of transistor Q33 and the base of transistor Q37 is direct-coupled to the collector of transistor Q35.

The output stage comprises a pair of NPN transistors Q38, Q39 which may operate in the usual Class AB mode. The base of output transistor Q38 is direct-coupled to the emitter of transistor Q36 and the base of output transistor Q39 is direct-coupled to the emitter of transistor Q37. The respecive emitters of transistors Q38, Q39 are preferably provided with resistors R89, R90. The collector of transistor Q38 is connected to the positive supply line $B_3^+$ and the collector of transistor Q39 is connected to output bus O*d*.

There is provided a main power supply comprising a power transformer T4 having its primary connected through fuse F8 to the line terminals L5, L6 of the house supply (not shown). The secondary of transformer T4 is connected to a rectifier bridge B4 in turn connected to a pair of filter capacitors C33, C34. The junction of the latter is connected to the center-tap of the split secondary of transformer T4. This center-tap may be connected through a switch SW2 to ground so as to convert the motional feedback network to a conventional feedback arrangement if so desired. The negative supply line $B_3^-$ of the main power supply is provided with a fuse F9 and the positive supply $B_3^+$ is similarly provided with a fuse F10. A capacitor C32 and a resistor R94 extend in series between the output bus O*d* and ground so as to maintain a load on the output of the amplifier at high frequencies where the inductance of loudspeaker S causes its impedance to rise far above its nominal value.

The bridge network for deriving the motional feedback signal comprises a resistor R93 and inductor L in series with loudspeaker S, and a pair of resistors R91, R92. The junction of inductor L and resistor R92 is connected to the center-tap of the main power supply.

The motional feedback signal is generated at the node FT at the junction of resistors R91, R92 and is fed back through resistor R86 to the emitter of the first common-emitter stage transistor Q31. Also connected to the latter is a feedback resistor R74 extending from output bus O*d* so as to supply conventional negative feedback in addition to the motional feedback. As described above with respect to the previous figures for a purely motional feedback signal at node FT the magnitude ratio of resistor R92 and R91 is the same as that of resistor R93 to the blocked voice-coil resistance of loudspeaker S and that of inductor L to its blocked voice-coil inductance. A departure from this ratio may be intentionally selected so as to inject a conventional feedback signal through feedback resistor R86 in addition to the signal corresponding to the motion of the cone of loudspeaker S.

It is to be understood that the embodiments disclosed herein are merely illustrative of several of the many forms which the invention may take in practice and that numerous modifications thereof will readily occur to those skilled in the art without departing from the scope of the invention as delineated in the appended claims which are to be construed as broadly as permitted by the prior art.

I claim:

1. A motional feedback speaker system comprising a transistor power amplifier and a loudspeaker, said amplifier including a single-ended push-pull output stage including at least two transistors connected in series at a midpoint of the stage, a split power supply connected to said output stage and having a center-tap, a pair of output terminals, means D.C.-coupling one of said output terminals to said center-tap, means D.C.-coupling the other output terminal to said output stage midpoint, a complementary-symmetry push-pull drive stage, means D.C.-coupling said drive stage to said output stage, amplification means, means D.C.-coupling said amplification means to said drive stage, a D.C. feedback network extending from said output stage to said amplification means for maintaining said output terminals at substantially the same D.C. potential, means D.C.-coupling said loudspeaker to said output terminals, means generating a motional feedback signal functionally related to the acoustic output of said loudspeaker, and feedback means injecting said motional feedback signal into said amplification means.

2. In the system recited in claim 1, said loudspeaker having a movable cone and a voice-coil for driving said cone, means connecting said output terminals to said voice-coil, said generating means comprising a feedback coil connected to said cone for generating an electrical signal functionally related to the movement of said cone, said amplification means comprising preamplifier means having a node for the injection of negative feedback, and said feedback means comprising a feedback network connected from said feedback coil to said node to inject said generated signal into the latter.

3. A motional feedback speaker system as recited in claim 2 wherein said loudspeaker comprises magnetic circuit means including two cylindrical air gaps, said voice-coil extending coaxially within one of said gaps and said feedback coil extending coaxially within the other gap, the difference between the respective axial lengths of said feedback coil and said other gap being at least equal to the difference between the respective axial lengths of said voice-coil and said one gap.

4. A motional feedback speaker system as recited in claim 1 wherein said generating means comprises a network responsive to the voltage across and current through said loudspeaker to generate a feedback signal substantially proportional to the motional impedance thereof.

5. A motional feedback system as recited in claim 4 wherein said network comprises a resistive element extending in series between said one output terminal and power supply center-tap.

6. A motional feedback speaker system as recited in claim 5 wherein said loudspeaker has a voice-coil with a predetermined D.C. resistance and a predetermined blocked voice-coil inductance, said resistive element having a resistance magnitude which is a predetermined fraction of said D.C. resistance of the loudspeaker voice-coil, and said inductive element having an inductance substantially equal to the same predetermined fraction of said blocked voice-coil inductance.

7. A motional feedback system as recited in claim 5 and comprising a pair of impedances connected at a node and extending in series between said other output terminal and said center-tap, said injecting means taking said feedback signal at said node and transmitting said feedback signal to said amplification means.

8. A system as recited in claim 1 wherein said amplification means comprises a stage having a feedback injection node, said feedback means constituting a D.C. feedback transmission path D.C.-coupled both to said motional feedback generating means and to said feedback injection node, and said means D.C.-coupling said amplification means to said drive stage constituting a D.C. forward signal transmission path from said amplifications means to said drive stage, thereby eliminating low-frequency phase shift couplings in both the forward and feedback transmission paths of the feedback loop extending between and including said amplification means stage and said loudspeaker, so as to permit the application of a large amount of feedback with a substantial low-frequency stability margin.

9. A motional feedback system as recited in claim 1 for reproduction without audible distortion of a high-fidelity music signal wherein said amplification means comprises at least a first transistor of one polarity type and a second transistor of complementary type and each transistor having a collector, a base and an emitter, a network D.C.-coupling the first transistor collector to the second transistor base, a ground, a bias reference node maintained at a potential relatively fixed with respect to said ground and independent of potential variations in said power supply, bias means connecting said bias reference node to said first transistor base to supply bias current to the latter, an A.C. ground, means connecting said second transistor emitter to said A.C. ground, said feedback network transmitting a feedback signal to vary the potential at said first transistor emitter, said drive stage comprising at least two complementary transistors each having an emitter and a base, network means constituting D.C. transmission paths from said second transistor collector to said drive transistor bases, means conductively connecting said drive transistor emitters to said output stage midpoint, and said motional feedback means transmitting said motional feedback signal to vary the potential at said first transistor emitter.

10. A motional feedback system as recited in claim 9 wherein said loudspeaker has a voice-coil with a predetermined D.C. resistance, said motional feedback signal generating means including a bridge network responsive to the voltage across and current through said loudspeaker to generate a feedback signal functionally related to the loudspeaker motional impedance, said bridge network comprising a resistive element extending in series between said one output terminal and said power supply center-tap, said resistive element having a resistance magnitude which is a predetermined fraction of said D.C. resistance of the loudspeaker voice-coil.

References Cited

UNITED STATES PATENTS

| | | |
|---|---|---|
| 3,009,991 | 11/1961 | Bekey. |
| 3,073,899 | 1/1963 | Farnsworth. |
| 3,118,972 | 1/1964 | Walczak. |
| 3,365,545 | 1/1968 | Petrie. |
| 3,376,388 | 4/1968 | Reiffen. |

KATHLEEN H. CLAFFY, Primary Examiner
W. A. HELVESTINE, Assistant Examiner

U.S. Cl. X.R.

330—15, 19, 22